(12) United States Patent
Pearson

(10) Patent No.: US 7,739,615 B2
(45) Date of Patent: Jun. 15, 2010

(54) COLOR ENCODED KEYBOARD AND METHOD

(76) Inventor: Mark Pearson, 2733 N. Power Rd., Suite 102-463, Mesa, AZ (US) 85215

( * ) Notice: Subject to any disclaimer, the term of this patent is extended or adjusted under 35 U.S.C. 154(b) by 899 days.

(21) Appl. No.: 11/049,194

(22) Filed: Feb. 2, 2005

(65) Prior Publication Data

US 2005/0134573 A1  Jun. 23, 2005

Related U.S. Application Data

(63) Continuation-in-part of application No. 10/626,801, filed on Jul. 23, 2003, now abandoned.

(51) Int. Cl.
G06F 3/048 (2006.01)
G06F 3/02 (2006.01)
B41J 5/00 (2006.01)

(52) U.S. Cl. .................. 715/773; 715/764; 345/168; 345/172; 400/487

(58) Field of Classification Search ............. 715/773, 715/764, 779, 783, 771; 345/168, 172; 400/490, 400/495, 487
See application file for complete search history.

(56) References Cited

U.S. PATENT DOCUMENTS

| | | | | |
|---|---|---|---|---|
| 4,233,601 A | * | 11/1980 | Hankins et al. | 345/581 |
| 4,384,284 A | * | 5/1983 | Juso et al. | 345/156 |
| 4,555,193 A | * | 11/1985 | Stone | 400/486 |
| 4,694,286 A | * | 9/1987 | Bergstedt | 345/594 |
| 4,755,072 A | | 7/1988 | Hoornweg | |
| 4,853,878 A | * | 8/1989 | Brown | 715/202 |
| 5,021,972 A | * | 6/1991 | Nishi | 715/223 |
| 5,249,263 A | * | 9/1993 | Yanker | 345/594 |
| 5,334,992 A | * | 8/1994 | Rochat et al. | 345/22 |
| 5,375,200 A | * | 12/1994 | Dugan et al. | 715/804 |
| 5,579,034 A | * | 11/1996 | Aoyama et al. | 345/168 |
| 5,598,523 A | * | 1/1997 | Fujita | 715/840 |
| 5,694,562 A | * | 12/1997 | Fisher | 715/839 |
| 5,700,097 A | * | 12/1997 | Kuhlenschmidt | 400/487 |
| 5,729,699 A | * | 3/1998 | Hashimoto et al. | 705/27 |
| 5,802,342 A | * | 9/1998 | Yoneoka et al. | 345/537 |
| 5,867,729 A | * | 2/1999 | Swonk | 710/8 |
| 5,905,493 A | * | 5/1999 | Belzer et al. | 715/835 |

(Continued)

FOREIGN PATENT DOCUMENTS

DE  003304859 A1 * 8/1984

(Continued)

OTHER PUBLICATIONS

"Color Text"—Text Enhancer/Color Editor Program for the IBM Storyboard Program, IBM TDB, vol. 29, Issue No. 10, pp. 4251-4252, Mar. 1, 1987.*

*Primary Examiner*—Tadeese Hailu
(74) *Attorney, Agent, or Firm*—Mark R. Wisner

(57) ABSTRACT

A computer keyboard optimized for generating multi-color text documents is described. A standard keyboard includes a plurality of selected function keys that are programmed to change the document text color when activated. The function keys are displayed on a computer display screen and each of the selected keys further includes color indicia to indicate the new text color that results from activation of that key and all color changes can be performed at the same normal typing speed.

15 Claims, 5 Drawing Sheets

U.S. PATENT DOCUMENTS

| | | | |
|---|---|---|---|
| 6,445,380 B1 * | 9/2002 | Klein | 345/168 |
| 6,611,253 B1 * | 8/2003 | Cohen | 345/168 |
| 6,850,225 B1 * | 2/2005 | Whitcroft | 345/168 |
| 6,943,776 B2 * | 9/2005 | Ehrenburg | 345/168 |
| 7,180,524 B1 * | 2/2007 | Axelrod | 345/593 |

FOREIGN PATENT DOCUMENTS

| | | | |
|---|---|---|---|
| JP | 408147296 A | * | 6/1996 |

* cited by examiner

COLOR ENCODED KEYBOARD AND METHOD

This application is a continuation-in-part of application Ser. No. 10/626,801 filed Jul. 23, 2003.

BACKGROUND OF THE INVENTION

The present invention relates to the field of computer keyboards, and more particularly to keyboards for which selected keys are programmed to effect text color changes and which are color encoded to indicate the resulting text color.

Most computer-generated documents have previously been printed with black text on white paper. When color was used in printed documents, it was common to minimize the number of colors used and the number of color changes due to the relative inconvenience of initiating text color changes. Even with the widespread availability of color printers, many documents such as letters, reports, and memos continue to be generated primarily in black and white despite a growing appreciation of the enhanced impact that multi-color documents can provide. One reason why computer users do not more freely utilize changes in text color to increase the visual impact of their correspondence and other documents is that most application software requires an inconvenient and relatively slow process to effect text color changes. A mouse may be used to manipulate icons on a function bar, but this requires removal of the hand from the keyboard. Effecting text color changes from the keyboard often requires a complicated multi-step series of keyboard strokes which are difficult to remember. Alternatively, the number of key strokes required to effect a text color change may be reduced by creating a programmed macro. If more than one or two text colors are so programmed, however, it becomes difficult to memorize the correspondence between the key combination that causes a particular color change and the desired color.

BRIEF DESCRIPTION OF THE PRIOR ART

Each key of a computer keyboard normally has indicia printed thereon to indicate a function that is performed by pressing that key. For example, on the conventional QWERTY keyboard, the letter "Q" printed on the key indicates that pressing that key will cause the letter "q" or "Q" to be inserted into a text document depending upon whether the SHIFT key is simultaneously pressed.

Computers usually permit some or all keys to be reprogrammed to perform multi-step functions as well as to simply change the output character, such programming generally being referred to as creating a macro. For example, a command such as CTRL-B might cause the output text to appear in bold type. An obvious problem with such "altered" keyboards is that there is nothing on the face of the original key to indicate the new function.

The prior art reveals efforts to resolve some of the above problems with the use of substitute key caps and key cap overlays. U.S. Pat. No. 4,755,072 to Hoornweg discloses temporary key caps having different indicia that can be placed over the original cap to indicate an altered function or, alternatively, to mask the function if an opaque cap having no indicia is used. It also discloses the use of a colored key cap to distinguish a subset of keys while maintaining the original key function. While suggesting that colored key caps may ease association between color and function, Hoornweg does not teach how this might be done.

Accordingly, there is a need for a method and apparatus that permits the use of a control or function key having color coding corresponding to the text color change that results from activation of the control key.

SUMMARY OF THE INVENTION

The present invention provides a method and apparatus to accurately and efficiently alter text color while typing a document. Selected function keys are programmed to change the text color in a document to be typed when the function key is activated. By programming a selected subset of text colors from the set of all colors available within the software application, the user predetermines a subset of text colors desired for use within a document to be created. Each function key is also provided with unique color indicia to visually indicate to a user the text color change that results from activation of the function key.

It is an object of the present invention to efficiently change the text color in computer-generated text documents.

It is a further object to provide a visual correspondence between a key that effects a text color change and the color of the resulting text. This visual correspondence may be provided on the key or displayed on a monitor or display screen.

A method of color encoding a computer keyboard having these and other advantages includes selecting from a set of possible text colors provided by a computer a subset of text colors for use in documents to be generated from the keyboard. Selected function keys are programmed to generate the selected text colors, with each selected function key generating a different selected text color. Each selected function key is provided with a color indicia to display the programmed text color of that key. Alternatively, the function keys and associated colors may be displayed on a monitor.

A computer keyboard optimized for generating multi-colored text documents having these and other advantages includes a selected group of programmable function keys that are programmable to change the text color in a document when activated. Each of the selected keys is programmed to provide a selected text color. The keys may be provided with color indicia to display the text color generated by the activation of that function key, or the keys and their associated colors may be displayed on a monitor or display screen.

BRIEF DESCRIPTION OF THE DRAWINGS

Other objects and advantages of the invention will become apparent from a study of the following specification when viewed in light of the accompanying drawings, in which.

DETAILED DESCRIPTION OF THE INVENTION

Figure 1:
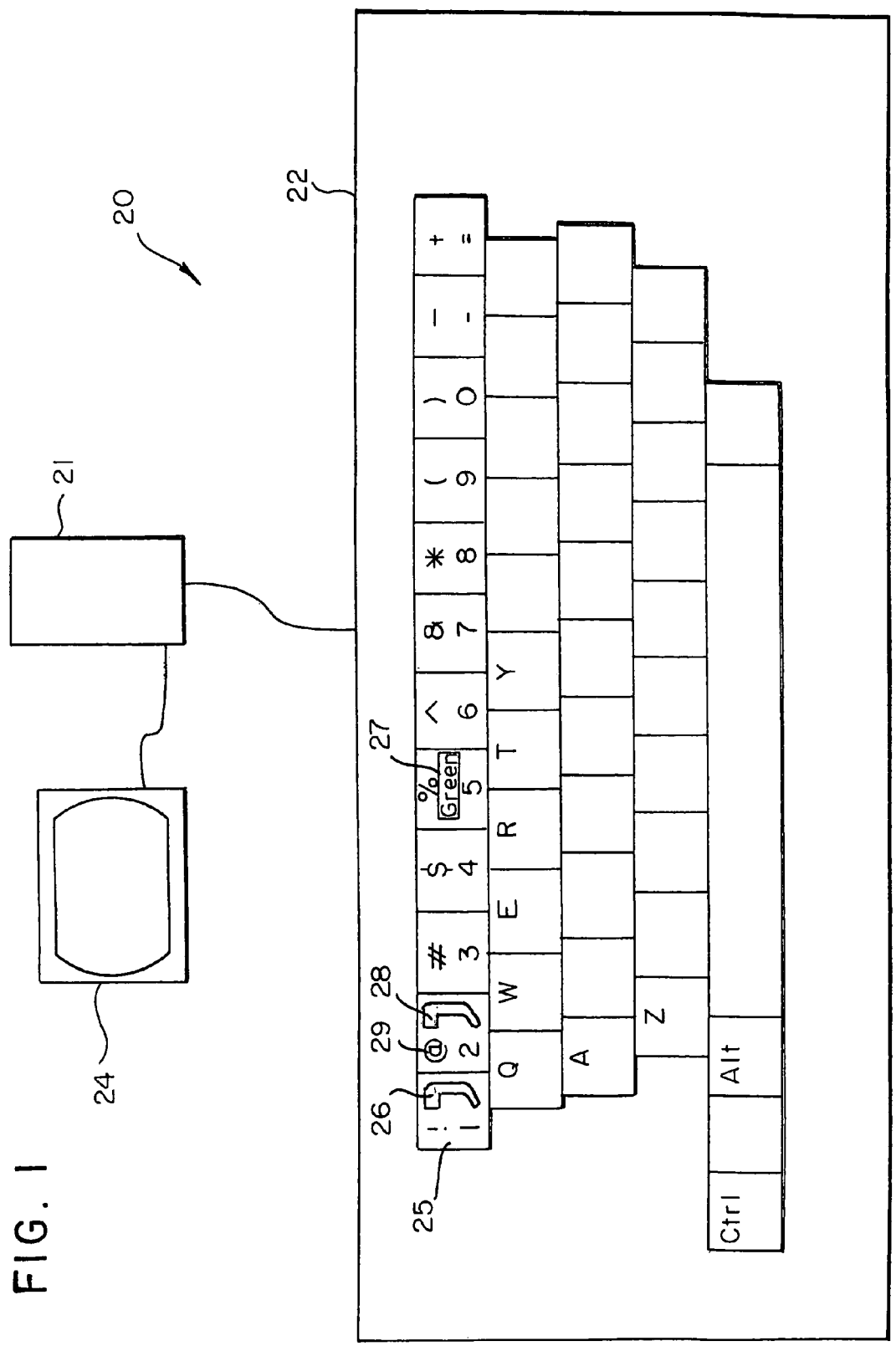
FIG. 1 is a plan view of a computer keyboard to which color indicia has been applied to certain function keys in accordance with a first embodiment of the invention.

The invention according to a first embodiment will be described with reference to FIGS. 1-5. In FIG. 1, a computer 20 includes a console 21 connected to a keyboard 22 and a display 24. A key 25, which in this embodiment has been chosen to be the key marked with the numeral "1", is provided with a decal 26. Decal 26 will preferably be colored. Alternatively, a decal 27 may have a color name printed thereon. A decal 28 is similarly affixed to another key 29, which in this embodiment has been chosen to be the key marked with the numeral "2". Decal 28 is also preferably colored, but has a different color than that of decal 26. Alternatively decal 28 may have the name of a second color printed thereon similar to decal 27. Additional keys, for example the keys marked with numerals "3" through "0" and symbols "-" and "=," may also have decals affixed, each additional decal being a different color or displaying the name of a different color. The back portion of each decal preferably is coated with a paste-on or adhesive material that fastens the decal to the function key during normal use but that permits the decal to be removed and replaced when a new text color is programmed into the function key.

Although the "number", "-" and "=" keys are shown as the function keys in this embodiment, it will be readily apparent that any key or keys on the keyboard could serve as the color function keys.

Figure 2:
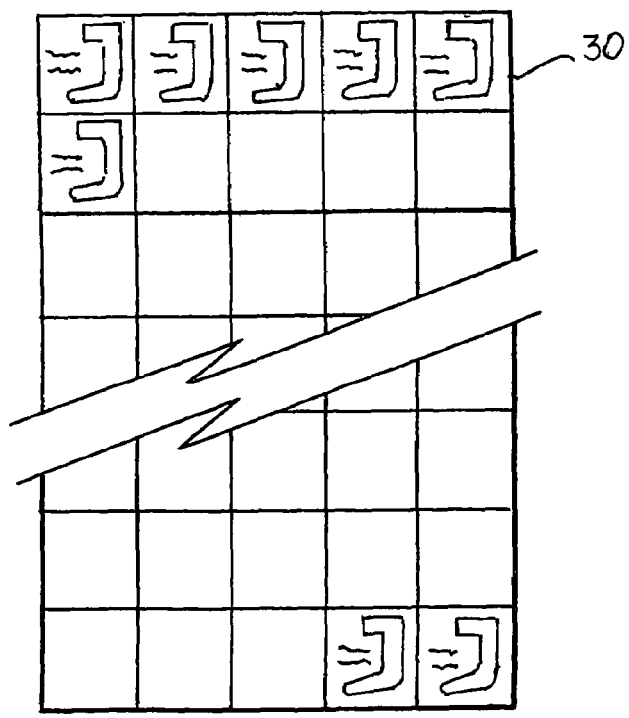
FIG. 2 is a plan view of a sheet of colored decals and identifying information for use on the keys of the keyboard of FIG. 1.

FIG. 2 illustrates a backing sheet 30 on which are provided a number of decals with corresponding color names and code numbers from which a user can select the colors that are to be fastened to selected keys. The number and colors of decals on sheet 30 are a representative subset of the diversity of available text colors offered by the application software and will preferably exceed the number desired by a user for a given document or series of documents. For example, the total number of decals provided may be 256, out of which the user may select 12 for attachment to the "1" through "0", "-" and "=" keys. A greater or lesser number of decals may be utilized at the election of the user according to personal preference and functional keys used, and the decals may be provided on one, two, or more sheets.

Figure 3:
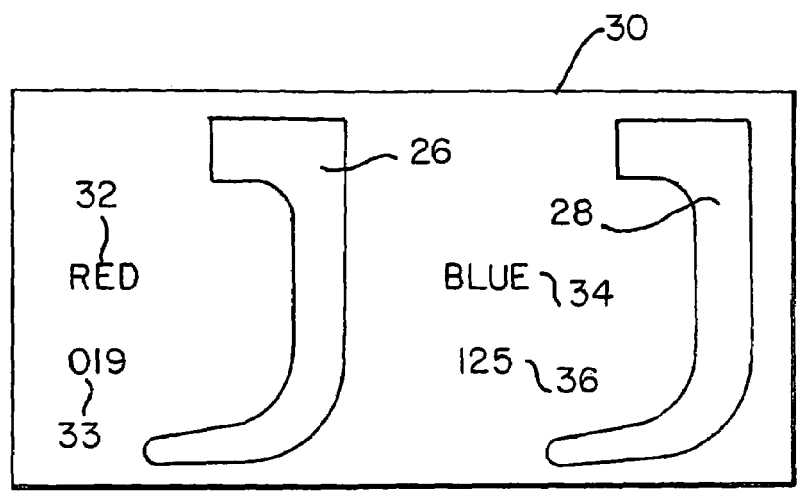
FIG. 3 is an enlarged and more detailed view of a segment of the sheet of colored decals of FIG. 2.

FIG. 3 is a detailed view of the decals mounted on the backing sheet 30 before the decals are removed for fastening to a key 25. By way of example only, the color of decal 26 is red. Backing sheet 30 also has a decal 32 bearing the name of the color of decal 26 and optionally, a code number 33 to distinguish the red on this decal from another available color, such as a different shade of red. Decal 26 is sized to be affixed to a key, such as key 25, without covering the numeral "1" or the symbol "!" that is normally printed on the key. The colored decal 28, which by way of example only is blue, is similarly provided on backing sheet 30 with a corresponding name 34 and code number 36.

Figure 4:
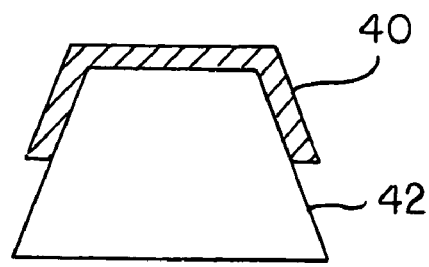
FIG. 4 is a front plan view of a colored key cap of the prior art which suitable for color encoding a computer keyboard in accordance with one embodiment of the invention.
Figure 5:
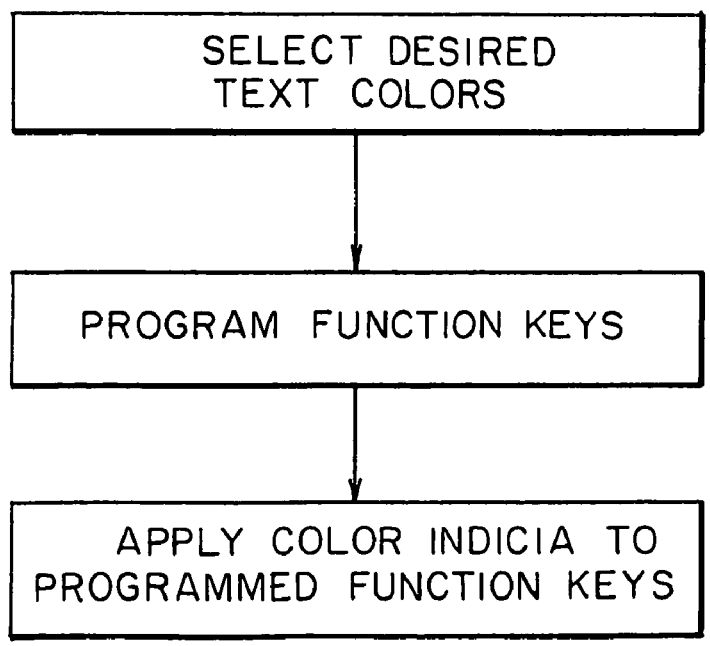
FIG. 5 is a flow chart showing the sequence of steps for the first embodiment of the invention.

FIG. 4 illustrates a colored key cap 40 removably fitted over a keyboard key 42. Colored key caps designed to be removably fitted over a key are well-known in the prior art and will not be further described here. When the colors of the key caps are provided to correspond with the text colors desired by a user, however, the caps may be utilized in place of decals or color names in an alternative embodiment of the present invention. For example, a red key cap may be fitted over the key 25 marked with the numeral "1" instead of affixing the red decal 26. The number and colors of key caps provided preferably correspond to the diversity of available text colors offered by the application software and preferably exceed the number desired by a user for a given document or series of documents. For example, the total number of colored key caps provided may be 256, out of which the user may select twelve caps for attachment to the "1" through "0," "-" and "=" keys. A greater or lesser number of colored key caps may be utilized at the option of the user according to personal preference. Alternatively, the original keys provided with the keyboard may be physically removed and replaced with colored keys.

A user selects a subset of desired text colors from the set of colors provided by an application. The application may be a commercially available word processing application such as Microsoft Word® or Corel WordPerfect®, each of which provides 256 choices of possible text colors. Each application provides the capability for viewing the array of available colors and selecting them with the aid of the cursor.

After choosing a subset of colors, for example twelve colors from the possible 256, the user next selects twelve function keys to be programmed. For example, the user may select the keys "1" through "0" plus "-" and "=." The user next chooses a command instruction to cause the text color change, such as "CTRL-1," "CTRL-2," . . . "CTRL-=." That is, a text change would result when the user depressed the "1" key while simultaneously depressing the "CTRL" key. Preferably, the command instruction will be chosen from among those not already preprogrammed into the application software by the manufacturer.

It is well within the ordinary skills of a computer programmer to develop an application that prompts the user to select a function key and an associated text color, and then programs the keyboard to effect the appropriate text color change upon activation of a given function key. Alternatively, the user may perform the programming for each function key in the form of a macro and assign the macro to the function key as a shortcut. The program may also provide for the selection of available colors from a drop-down screen showing the array of available colors. Selection of a specific text color may be made with the aid of the cursor.

The user then provides each programmed function key with indicia to indicate the color change that results from activating that key, as was previously described.

The method described above is illustrated in FIG. 5. It is readily apparent that, after the desired text color for each function key has been selected, it makes no difference whether the programming of the function keys occurs before or after the application of the color indicia.

Figure 6:
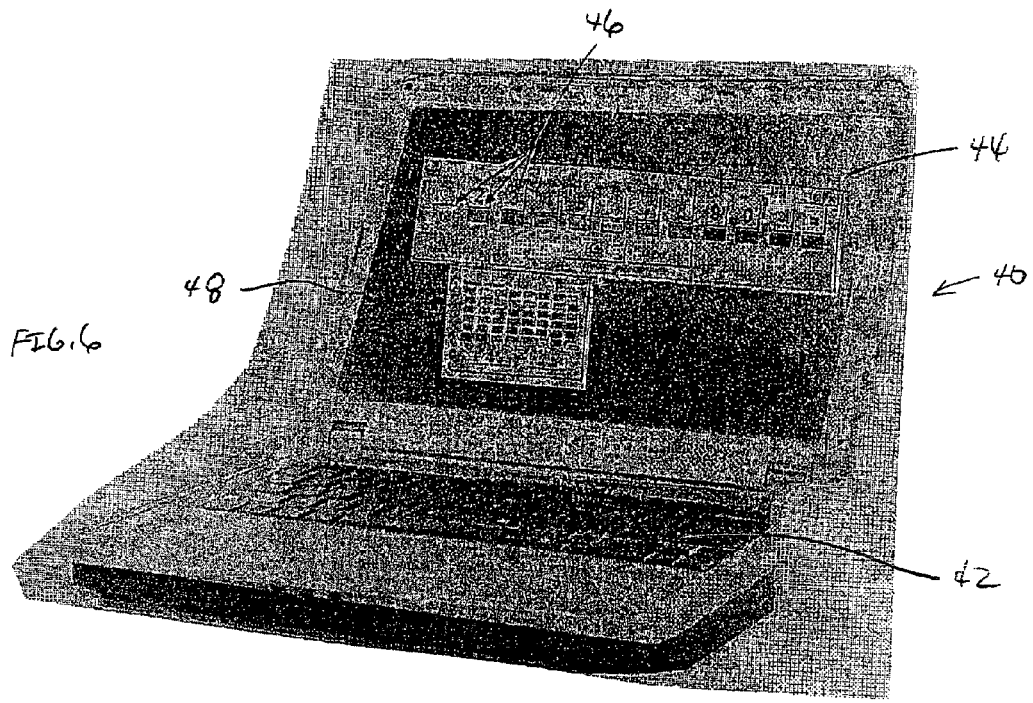
FIG. 6 is a perspective view of a laptop computer in which the display screen displays color coded function keys according to a further embodiment of the invention.
Figure 7:
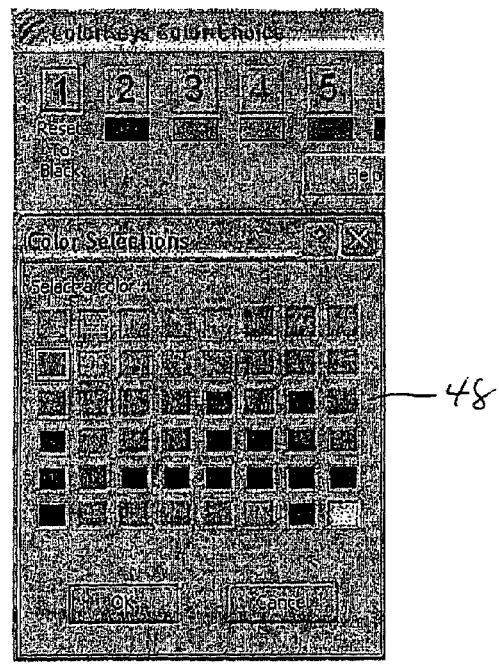
FIG. 7 is a detailed view of a color selection display for the screen of FIG. 6.
Figure 8:
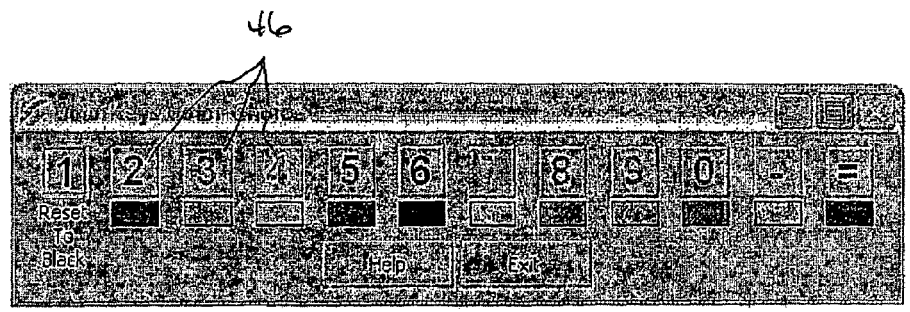
FIGS. 8 and 9 are detailed views of regular and minimized displays of color coded function keys of FIG. 6, respectively.

In lieu of altering the function keys of a keyboard to produce colored text, it is possible to program the keys via visual feedback from the computer monitor or screen and operation of a mouse as will be described in connection with FIGS. 6-10. In FIG. 6 is shown a laptop computer 40 including a keyboard 42 having a plurality of keys arranged as in the keyboard shown in FIG. 1 and a display screen 44. When software for encoding the keys for color is opened, the function keys are displayed 46 on the screen, as is a color selections chart 48. A detailed view of the color selection chart is shown in FIG. 7 and a detail of the displayed keys is shown in FIG. 8. As in the embodiment of FIGS. 1-5, the function keys for the example described include the number keys 1-0, the "-" key and the "=" key. Other keys or additional keys may serve as the function keys.

Figure 9:
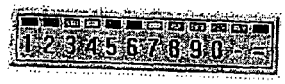

Prior to programming the keys for color, they are all set for black. In order to program individual keys for color, the desired key is selected from the display 46 via a mouse and the color for that key is selected from the color selection chart by the mouse. If the choice is acceptable, the OK button is activated. Color selections for the remaining keys are made in the same manner. Once all of the keys have been programmed for color, the color selection chart is closed and the function key display 46 is minimized. FIG. 9 shows the function key display in the minimized state. Preferably the minimized function key display is still visible in a desired location on the display screen so that it can be quickly accessed. In order to see the color programmed to a key, the CONTROL key and the number color of choice are selected. If it desired to change the color programmed for a specific key, the minimized function key display is maximized by double clicking thereon and the function key whose color is to be changed is activated. The color selection chart is displayed, the new color for the key is selected, and the OK button is activated. The chart is removed from the screen and operation of the function key will change the text color to that to which the key has been changed.

The color chart and function key display may be moved around the screen by the mouse at the user's discretion. With the method of operation according to the invention, colored text is easily provided by a standard keyboard with a minimum of key strokes or programming functions being required to select or change a desired color for the text. In addition, by selecting and highlighting portions of text, the color thereof can be quickly changed by activation of a color function key.

Figure 10:
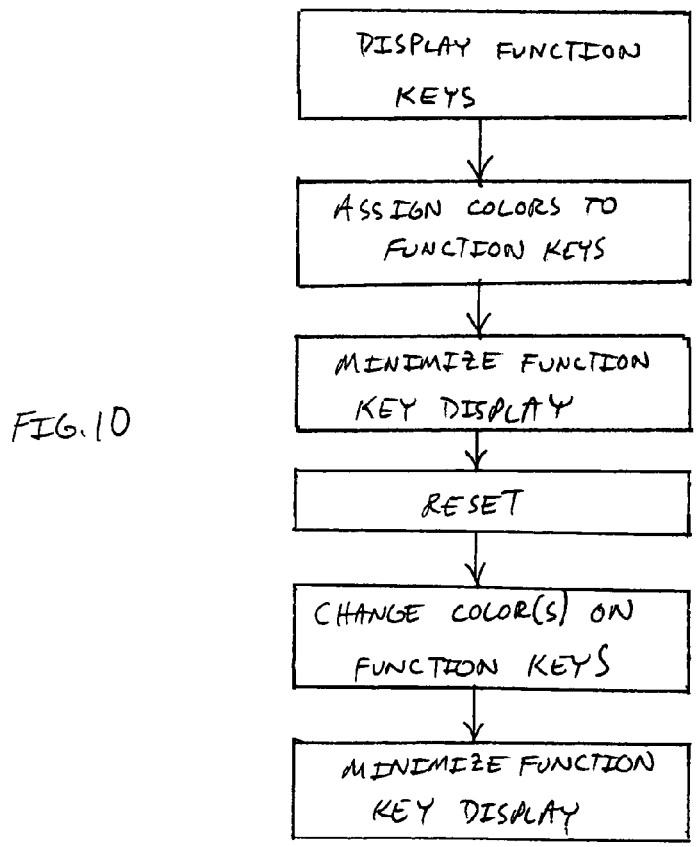
FIG. 10 is a flow chart showing the sequence of method steps for another embodiment of the invention.

The method according to this embodiment of the invention will be described with reference to FIG. 10. The function keys are displayed on the screen of a laptop computer or on a monitor connected with a desktop computer. The user assigns selected colors to the function keys. The function key display is minimized, though preferably still visible on the screen or display. If it is desired to reset the colors programmed to one or more function keys, the function key display is recalled and different colors are programmed on the function keys. Next, the function key display is minimized while the user composes the colored text.

It will be appreciated that any number of color choices may be provided in the color selection display of FIG. 7. In addition, other options are available for selecting colors of text. For example, words or phrases within text may be highlighted in a known manner and then the color for the highlighted word or phrase may be selected using a simple mouse click and scroll to the color desired in lieu of activation of the control or function keys.

While the preferred forms and embodiments of the invention have been illustrated and described, it will be apparent to those of ordinary skill in the art that various changes and modifications may be made without deviating from the inventive concepts set forth above.

What is claimed is:

1. A method of changing the color of text being typed with a computer keyboard from the keyboard comprising the steps of:
   (a) selecting, from a set of possible text colors provided by a computer, a subset of text colors for use in a document to be generated by typing on the keyboard of the computer;
   (b) assigning a selected color by programming a color selected from the subset of text colors to a selected key to cause the selected key to generate text of the selected color from the selected key when typing; and
   (c) displaying the set of programmed keys to which selected colors have been assigned, each programmed key being displayed with a color indicia indicative of the programmed color of that key, while typing text from the keyboard, text color being changed to the color assigned to a programmed key by selection of the key of the keyboard to which a particular color has been programmed.

2. A method as defined in claim 1, and further comprising the step of changing the selected text color programmed for a selected key.

3. A method as defined in claim 2, and further comprising the step of minimizing the display of the programmed keys with a color indicia indicative of the programmed text color of each key.

4. A method as defined in claim 2, wherein said selecting step comprises displaying a color selection chart from which colors are selected and assigned to a selected key.

5. A method as defined in claim 1, wherein said selected keys comprise twelve keys on the keyboard for the numbers "1" through "0" and "-" and "=".

6. A method as defined in claim 1, wherein said selected keys comprise twelve keys on the keyboard for the numbers "1" through "0" and "-" and "=".

7. A method of color encoding selected keys of a computer keyboard for changing the color of text being typed from the keyboard using the selected keys comprising the steps of:
   (a) selecting, from a set of possible text colors provided by a computer, a subset of text colors for use in documents to be generated from the keyboard;
   (b) programming one or more of the keyboard keys in a set of selected keys to generate a selected text color, each programmed key generating the selected text color assigned thereto; and
   (c) displaying the programmed keys to which the selected text colors have been assigned by applying color indicia to each of the programmed keys indicative of the text color produced by that key, text color being changed by typing the key having the selected color indicia applied thereto.

8. A method as defined in claim 7, and further comprising the step of changing the selected text color of a programmed key and the color indicia applied thereto.

9. A method as defined in claim 7, wherein said selecting step comprises displaying a color selection chart from which colors are selected and programmed to the selected key.

10. A method as defined in claim 9, wherein a color is programmed to a key from a color selection chart.

11. In a computer comprised of keyboard, mouse, and display, a method of changing the color of text typed from the keyboard comprising the steps of:
   (a) selecting, from a set of possible text colors provided by a computer, a subset of text colors for use in a document to be generated by typing on the keyboard;
   (b) assigning a text color selected from the subset of text colors to each key in a set of selected keys to generate the selected text colors by programming each key to type the selected color, each programmed key generating a different selected text color by typing on the programmed key;
   (c) displaying each programmed key with a color indicia indicative of the color of that key; and
   (d) changing the color of the text of the document by typing the programmed keyboard key without using the mouse.

12. A method as defined in claim 11, and further comprising the step of changing the selected text color programmed for a key in the set of selected keys.

13. A method as defined in claim 11, and further comprising the step of minimizing the display of the programmed keys with a color indicia indicative of the color of each programmed key.

14. A method as defined in claim 11, wherein said selecting step additionally comprises displaying a color selection chart from which colors are selected and programmed to a key.

15. A method as defined in claim 11, wherein said selected keys comprise twelve keys on the keyboard for the numbers "1" through "0" and "-" and "=".

* * * * *